Nov. 22, 1955  J. Z. BRUBAKER  2,724,556
VEHICLE HEATING AND MOTOR COOLING SYSTEM
Filed June 29, 1951  2 Sheets-Sheet 1
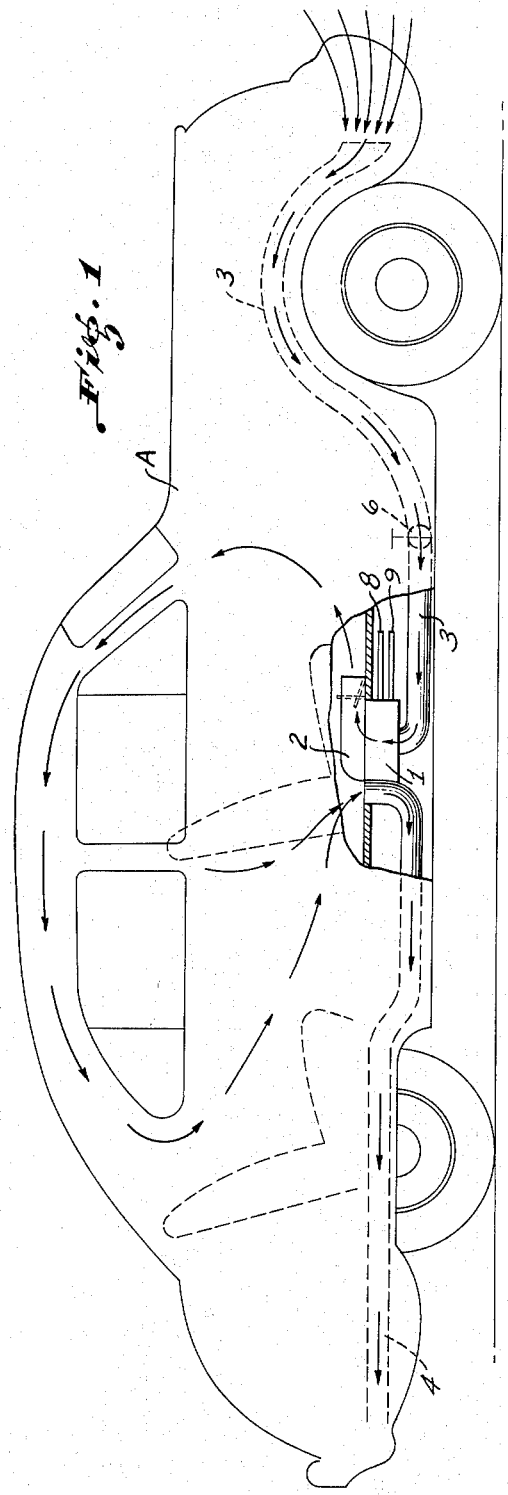
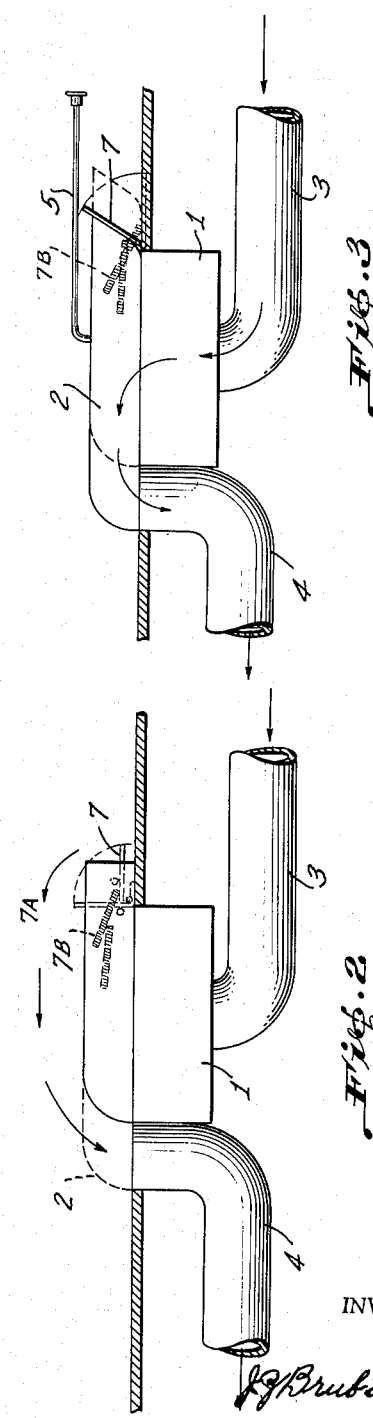
INVENTOR
J. Z. Brubaker
BY
ATTORNEY

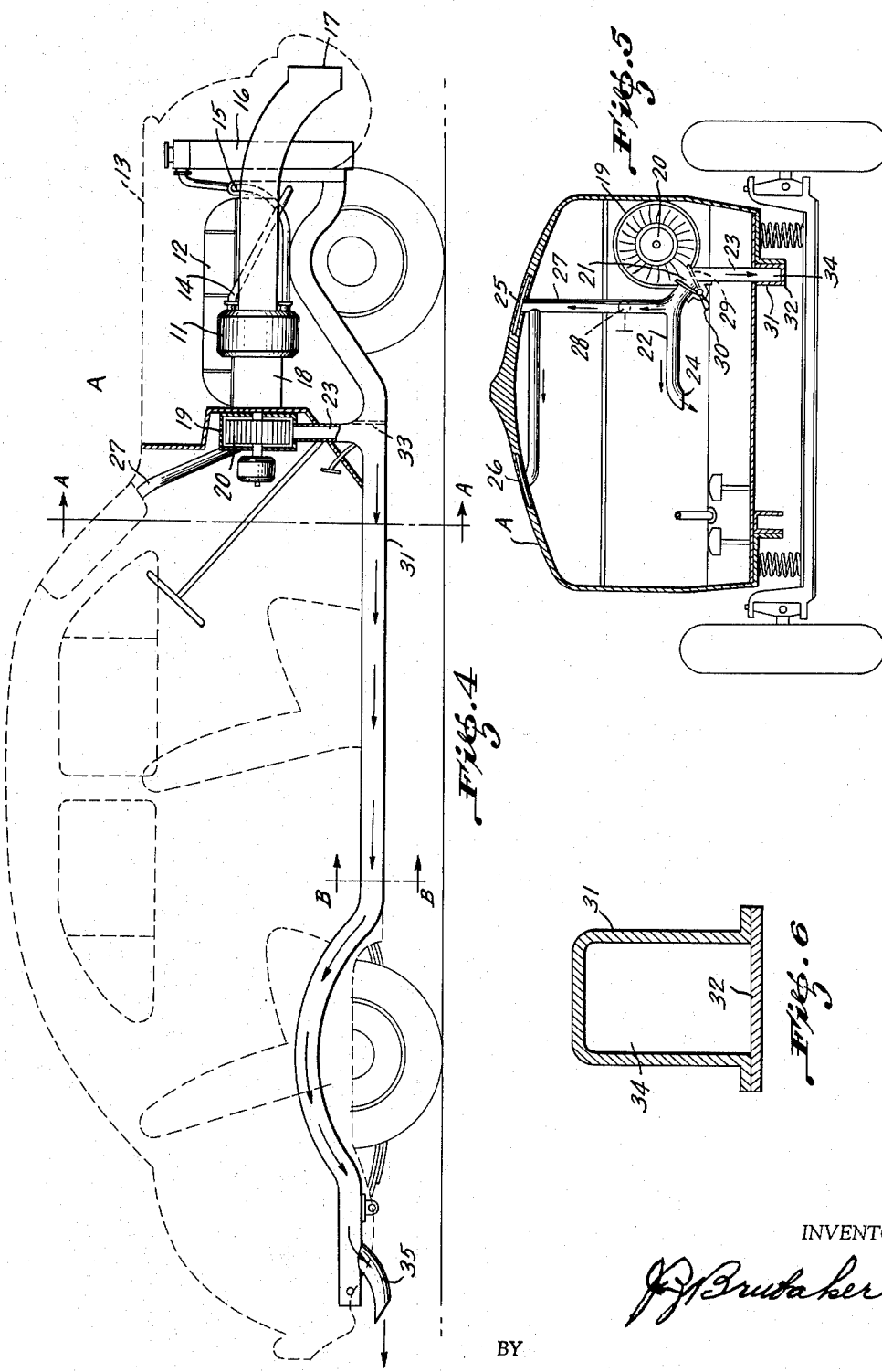

United States Patent Office 2,724,556
Patented Nov. 22, 1955

2,724,556

VEHICLE HEATING AND MOTOR COOLING SYSTEM

Jacob Z. Brubaker, Manheim, Pa.; Isaac M. Brubaker and Rufus M. Brubaker, executors of said Jacob Z. Brubaker, deceased Application June 29, 1951, Serial No. 234,315

1 Claim. (Cl. 237—12.3)

This invention relates to a vehicle heating and motor cooling system for use particularly with motor vehicles such as automobiles, trucks, busses and the like to air condition and ventilate them in cold weather as well as to cool the motors thereof in hot weather.

This application is a continuation-in-part of application, Serial No. 24,253, filed April 30, 1948, now abandoned.

The present tendency in the design of motor vehicles tends toward enclosing the motor of the vehicle within the body more completely than heretofore in order to enhance the streamlined appearance of the body of the vehicle with the result that less effective cooling of the water or other fluid used as a motor coolant in the motor is possible than in previous designs. Especially in hot weather during the summer months, engine temperatures are elevated to such a degree that boiling of the coolant is not infrequent, particularly when driving over hills and mountains, at high speeds for substantial periods of time, or under heavy pulls. Even though the coolant may not be elevated to the boiling temperature under such conditions, the motors frequently run at higher than normal desirable operating temperatures, with the result that the lubricating oil within the motor is likewise overheated and the consequent lower viscosity thereof results in decreasing the lubricating efficiency of the oil, thus impairing the life of the motor.

It is an object of the present invention to overcome the foregoing difficulties by providing a system which serves as a heater for the interior of the vehicle body in cold weather by warming incoming air by heat derived from the motor coolant and discharging the warmed air into the interior of the vehicle, and the same vehicle heater is used in an auxiliary system by which, in warm and hot weather, atmospheric air obtained from outside the vehicle passes through the heater and is heated, thereby lowering the temperature of the coolant which passes through said heater from the motor of the vehicle, but rather than passing the heated air into the vehicle interior, said heated air is discharged exteriorly and rearwardly of the vehicle, thereby supplementing the action of the conventional automobile radiator by reducing the normal temperature of the coolant a substantial number of degrees.

It is another object of the invention to effect the foregoing objective by several embodiments of systems which are simple and durable and capable of easy manipulation, said several embodiments respectively rendering themselves to adaptation to different designs of currently conventional motor vehicles.

It is a further object of the invention to utilize means to cover the open side of a channel member of the conventional frame of a motor vehicle for purposes of forming a conduit through which air is directed rearwardly and exteriorly of the vehicle from the heater of the system, whereby a suction effect is produced by a vehicle in forward motion and this results in efficient withdrawal of the heated air from the heater in hot weather without subjecting the occupants of the vehicle to any discomfort, thereby lowering he normal temperature of the motor through lowering the temperature of the cooling fluid or water.

A still further object of the invention is to provide a vehicle heater system which will be operable to heat the interior of the vehicle in such a manner that heated air is discharged, for example, laterally beneath the driver's seat of the vehicle in a forwardly direction, said heat then passing upward and rearwardly across the upper portion of the interior of the vehicle and then downwardly, the air then being withdrawn from the interior of the vehicle through an exhaust air conduit having an entrance disposed adjacent the floor of the vehicle, rearwardly of the heater, the exit of the exhaust air conduit being positioned exteriorly of the vehicle adjacent the rear end thereof, whereby the forward movement of the vehicle produces a suction effect relative to the exit end of the exhaust air conduit and effectively withdraws air from the interior of the vehicle.

Details of the foregoing objects and of the invention as well as other objects thereof are set forth in the following specification and illustrated in the accompanying drawings forming a part thereof.

In the drawings:

Fig. 1 is a side elevation of the exemplary motor vehicle, partly broken away so as better to illustrate details of the invention, said figure illustrating one embodiment of the invention and the manner in which it functions.

Fig. 2 is a fragmentary side elevation showing on a larger scale than in Fig. 1 a portion of the heater and engine cooler embodiment illustrated in Fig. 1 part of the mechanism being illustrated in one position in full lines and in another position in dotted lines.

Fig. 3 is a view similar to Fig. 2 but illustrating a slightly different form of the embodiment of the invention illustrated in Figs. 1 and 2.

Fig. 4 is another side elevation of an exemplary motor vehicle, the body thereof being illustrated in phantom fashion and a different embodiment of the heater and engine cooling system being illustrated therein.

Fig. 5 is a sectional view of the embodiment of the invention illustrated in Fig. 4, said view being taken on the line A—A of Fig. 4.

Fig. 6 is a fragmentary sectional detail taken on the line B—B of Fig. 4.

One embodiment of the vehicle heating and motor cooling system comprising the invention is illustrated in Figs. 1 and 2. Referring to these figures, an exemplary motor vehicle A is shown with an auxiliary hot-water type heater 1 mounted adjacent the floor of the vehicle A. The heater 1 is actually a heat exchanger of substantially conventional type in which tubes conduct water or other coolant by which the motor of the vehicle is cooled and air passes around said tubes of the heat exchanger for purposes of being warmed or heated by withdrawing heat from the water in the tubes. Details of the heater are not shown because it is of a substantially conventional type and illustration of such details is not believed necessary.

The heat exchanger or auxiliary radiator 1 is provided on the upper portion thereof with a shell-like element 2 which, as viewed transversely to Figs. 1 through 3 is substantially U-shaped in cross section. The element 2 is an air controlling means which is slidable relative to the upper portion of the heat exchanger 1. Fresh air from the surrounding atmosphere outside of the vehicle is introduced from the front end thereof, as viewed in Fig. 1, through an intake conduit 3 to the underside of the heat exchanger 1 as is clearly shown in Figs. 1 through 3. Said air passes around the heater coils within the heat exchanger and is warmed thereby.

When the element 2 is in the full line position thereof illustrated in Fig. 2 and likewise in Fig. 1, the warmed air will be discharged through the forward or right-hand end of the element 2 as viewed in Figs. 1 and 2, said warmed air being discharged forwardly from beneath the driver's seat of the vehicle. The warmed air then rises upwardly as shown by the arrows in Fig. 1 and the air will then pass rearwardly along the upper portion of the interior of the vehicle and thence downwardly between the front and rear seats of the vehicle. An exhaust air conduit 4 is provided in the vehicle as clearly shown in Fig. 1 particularly, the entrance end of said conduit 4 preferably being disposed adjacent the heat exchanger 1. The conduit 4 is preferably disposed below the floor of the vehicle and the exit end of the conduit 4 is disposed adjacent the rearward end of the vehicle and exteriorly thereof. During forward movement of the vehicle, a suction effect will be produced adjacent the exit or rearward end of the exhaust air conduit 4, whereby such suction will serve to withdraw air from the interior of the vehicle through the conduit 4 as illustrated by the arrows in Fig. 1.

If desired, a blower such as an electrically driven fan 6 may be introduced into the air intake conduit 3 for purposes of forcing air through the heat exchanger 1 but, at normal operating speeds, the force of onrushing air entering the conduit 3 will be sufficient to force air through the heat exchanger 1 and the suction produced at the exit end of the air exhaust conduit 4 will normally be sufficient to withdraw air from the interior of the vehicle so that a continuous supply of warmed fresh air is present within the vehicle at all times while driving in cold weather and such driving may be accomplished with all of the windows either completely or almost completely closed. No appreciable draft is produced within the vehicle by use of this system and said system affords a very satisfactory type of heating for the vehicle such as is not possible of attainment with currently used heating systems for vehicles. Fogging of the windows while using this system is also substantially if not completely eliminated.

The element 2 may conveniently be manipulated by a suitable handle 5 shown in Fig. 3, it being understood that a similar handle may be applied to the element 2 shown in Figs. 1 and 2. The element 2 may be shifted forwardly and rearwardly by the handle 5 between the full and dotted line positions of the element 2 illustrated in Figs. 2 and 3. Referring particularly to Fig. 2, as stated above, when the element 2 is in the full line position illustrated in Fig. 2, a hinged closure or door 7 is disposed in the full line, open position as in Fig. 2, whereby heated air may exit from the element 2 into the vehicle.

In the embodiment shown in Fig. 2, the element 2 has either a bar or a lug 7A extending between the sides, or projecting inward from one side, of the member 2. Normally, a spring 7B is connected at one end to the door 7 and at the other end to one side of the element 2 so as to urge the door 7 about its pivot to its closed or vertical position shown in dotted lines in Fig. 2. When the element 2 is moved to its rearward or dotted line position as shown in Fig. 2, the door 7 will be closed but, when the element 2 is moved forwardly to its full line position, the bar or lug 7A will engage the door 7 and pivot it against the action of the spring 7B to its open position.

In the embodiment shown in Fig. 3, which is slightly different from that shown in Fig. 2, one end of the door 7 is engaged by the forward end of one side of the element 2 when moved forwardly or to the right as viewed in Fig. 3, thereby moving the door 7 from closed to open position.

Movement of the element 2 to its forward position in either of the embodiments shown in Figs. 2 and 3 opens or uncovers the entrance end of the air exhaust conduit 4 as clearly shown in Figs. 1 through 3. Thus, when the element 2 is disposed in its forwardmost position, the heat exchanger 1 and the system of conduits connected thereto or associated therewith function as a heater for the vehicle A.

Upon the movement of the element 2 to its rearwardmost position, the entrance end of the exhaust air conduit 4 is closed from communication with the interior of the vehicle and the door 7 is moved to its closed position by the spring 7B. In this position of the element 2, the system will function, particularly in hot weather, as a means for reducing the normal temperature of the coolant of the motor and thereby cool the motor. While the normal radiator, not illustrated, of the vehicle A serves to maintain the coolant for the engine at a certain operating temperature, said temperature will be higher in warm weather than in cool weather. Particularly during heavy pulling such as driving in mountins or at continuous high speeds in hot summer weather, the temperature of the motor coolant will rise and, not infrequently, the coolant will reach the boiling temperature. Under these conditions, the heat exchanger 1, when the element 2 is in its rearwardmost position, will serve as an auxiliary radiator to withdraw additional heat from the coolant for the motor due to the additional cooling effect produced by fresh atmospheric air passing through the intake conduit 3 and through the heat exchanger 1, the incoming air thus being warmed or heated and thereby withdrawing heat from the coolant which is flowing through the heat exchanger 1 from and to the motor.

The air thus heated while passing through the heat exchanger is discharged through the conduit 4 exteriorly and rearwardly of the vehicle, thus not affording any discomfort to the occupants of the vehicle even in warm weather. To further insure no discomfort, the element 2 may be covered with suitable heat insulating material, not illustrated. In actual tests, it has been found on several different types of vehicles that the normal operating temperature of the coolant of a motor may be reduced at least 20° F. in hot weather by using the above described system as a motor cooler, thereby increasing the operating efficiency of the lubricant for said motor by preventing substantial reduction of the viscosity thereof and thus increasing the life of the motor. The coolant of the motor may be conducted to and from the heat exchanger 1 by suitable conduits 8 and 9 shown in Fig. 1.

The embodiment of the invention illustrated in Figs. 1 through 3 employs a so-called floor heater or heat exchanger 1. In Figs. 4 and 5, another embodiment of a heater and motor cooler is shown in a different arrangement within a vehicle A. Said arrangement operates however on a similar basic principle to the above described embodiment. Referring to Figs. 4 and 5, a heat exchanger or auxiliary radiator 11 is mounted preferably adjacent the motor 12 and under the motor hood 13 of the vehicle A. The heat exchanger 11 has a basic heat exchange principle similar to the heat exchanger 1 of the above described embodiment. Coolant from the motor 12 is supplied to the heat exchanger 11 through suitable conduits 14 and 15. The main heat exchanger or main conventional air-cooled radiator 16 is also shown in Fig. 4. Fresh air from the exterior of the vehicle is introduced into the heat exchanger 11 through an intake tube or conduit 17 terminating at its forward end to one side of the conventional radiator 16.

The air entering conduit 17 is heated by the auxiliary radiator or heat exchanger 11 and passes therefrom through a conduit 18 to a housing 19 containing an electrically driven fan 20. The housing 19 has an exit opening 21 which communicates with branch conduits 22 and 23. The conduit 22 terminates in a discharge opening 24 into which heated air is introduced into the interior of the vehicle. Heated air for defrosting purposes may be discharged through conventional slot-like louvres 25 and 26 by means of an additional conduit 27 in which a valve 28 is preferably positioned for controlling the flow of air to the conduit 27.

The branch conduits 22 and 23, adjacent their junction, are provided with a deflecting valve 29 having an operating handle 30. The branch conduit 23 preferably enters one of the channel members 31 of the frame of the vehicle A, said channel being shown in enlarged sectional view in Fig. 6. A plate 32 is fixed by welding or otherwise to the lower edges of the channel 31 so as to form a conduit having closed sides for purposes of conducting heated air from the housing 19 to the exterior and rearward end of the vehicle A. A wall 33 preferably is placed within the channel 31 adjacent the branch conduit 23 as shown in Fig. 4 so as to form an effective exhaust air conduit 34. A short tubular section 35 is fixed to the channel 31 adjacent the rearward end thereof as shown in Fig. 4, said tubular section having somewhat the appearance of a conventional exhaust pipe.

From the above description, it will be seen that when the valve 29 is disposed in the full line position shown in Fig. 5, heated air from the housing 19 will pass directly to the rear and exterior of the vehicle A, the above described system thereby functioning to reduce the normal temperature of the coolant of the motor 12 in the same manner as described above relative to the embodiment illustrated in Figs. 1 through 3, the system being used for this purpose particularly in hot weather. However, when the valve 29 is moved by the operating handle 30 to the dotted line position thereof, shown in Fig. 5, heated air will pass through branch conduit 22 and discharge opening 24 into the interior of the vehicle to heat the same in cold weather. Utilizing one of the channels of the frame of the vehicle as the exhaust conduit 34 effects a material economy in manufacturing a well as a saving of space through the utilizing of what is normally waste space as a conduit. It will be understood of course that, in the embodiment illustrated in Figs. 1 through 3, one of the channel members of the frame of the vehicle may be similarly used to comprise part of the exhaust conduit 4.

From the foregoing it will be seen that the present invention provides several embodiments of a system by which a vehicle may be heated in cold weather or the motor may be cooled in hot weather by lowering the normal temperature of the motor coolant through the heat exchange afforded by the heater when used as described above for this purpose. At very little additional cost, any motor vehicle may have either of the systems described above installed therein either when the vehicle is being manufactured initially or subsequently to such manufacturing. The operation of either of the systems is extremely simple while the functioning of the systems for either heating the vehicle in cold weather or cooling the motor in hot weather is highly effective.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

In a vehicle heating and motor cooling system the combination of a main fluid type radiator connected to the vehicle motor to cool the same, an auxiliary fluid type radiator mounted on the vehicle in spaced relation to said main radiator and being also connected to the vehicle motor to assist in the cooling thereof, inlet means to conduct air from the exterior of the vehicle at the forward end of the vehicle and pass it through said auxiliary radiator to be heated thereby, discharge means to conduct heated air from said auxiliary radiator to the vehicle interior to heat the same, additional discharge means to conduct heated air from said auxiliary radiator and discharge the same exterior of the vehicle, said discharge means constituting a conduit extending rearwardly of the vehicle so that the vacuum caused by movement of the vehicle will enhance flow of air therefrom, and control means operable selectively between a first position directing heated air from the auxiliary radiator through said first discharge means to the vehicle interior and a second position directing heated air from the auxiliary radiator through said additional discharge means to the exterior of the vehicle to thereby supplement motor cooling by the main radiator without increasing the temperature of the vehicle interior.

References Cited in the file of this patent

UNITED STATES PATENTS

| Number | Name | Date |
|---|---|---|
| 1,294,438 | Francisco | Feb. 18, 1919 |
| 1,478,403 | Sainsbury | Dec. 25, 1923 |
| 1,622,359 | Swartwout | Mar. 29, 1927 |
| 1,623,963 | Frushour | Apr. 12, 1927 |
| 1,676,021 | Gould | July 3, 1928 |
| 1,689,489 | Jancek | Oct. 30, 1928 |
| 1,727,824 | Hall | Sept. 10, 1929 |
| 1,913,339 | Modine | June 6, 1933 |
| 2,009,823 | Van Vulpen | July 30, 1935 |
| 2,158,758 | Lintern | May 16, 1939 |
| 2,316,421 | Hans | Apr. 13, 1943 |
| 2,342,901 | Schutt | Feb. 29, 1944 |
| 2,347,141 | Werdehoff | Apr. 18, 1944 |

FOREIGN PATENTS

| 829,324 | France | Mar. 28, 1938 |